US009013868B2

(12) United States Patent
Kuo et al.

(10) Patent No.: US 9,013,868 B2
(45) Date of Patent: Apr. 21, 2015

(54) PORTABLE ELECTRONIC APPARATUS, EXPANDING PLATFORM AND COMBINATION APPARATUS THEREOF

(71) Applicant: Wistron Corporation, New Taipei (TW)

(72) Inventors: Chien-Heng Kuo, New Taipei (TW); Hou-Chu Su, New Taipei (TW); Li-Sheng Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 212 days.

(21) Appl. No.: 13/887,650

(22) Filed: May 6, 2013

(65) Prior Publication Data
US 2014/0002974 A1 Jan. 2, 2014

(30) Foreign Application Priority Data

Jun. 27, 2012 (TW) .............................. 101123058 A

(51) Int. Cl.
G06F 1/16 (2006.01)
H05K 5/00 (2006.01)
H05K 7/00 (2006.01)
F16C 11/04 (2006.01)

(52) U.S. Cl.
CPC .............. G06F 1/1632 (2013.01); F16C 11/04 (2013.01); Y10T 16/534 (2013.01); G06F 1/1669 (2013.01); G06F 1/1681 (2013.01)

(58) Field of Classification Search
CPC ... G06F 1/1616; G06F 1/1662; G06F 1/1656; G06F 1/1669; G06F 1/1626; G06F 1/1632; G06F 1/1679; G06F 1/1635; E05D 5/0246; E05D 7/08; E05D 11/1064; F16C 11/04; E05Y 2900/132; E05Y 2900/20
See application file for complete search history.

(56) References Cited

U.S. PATENT DOCUMENTS

| 5,796,576 | A  | * | 8/1998  | Kim ........................... 361/679.28 |
| 5,829,997 | A  | * | 11/1998 | Okano et al. .................. 439/310 |
| 6,163,452 | A  | * | 12/2000 | O'Neal et al. ........... 361/679.27 |
| 6,317,315 | B1 | * | 11/2001 | Lee et al. ................. 361/679.29 |
| 7,017,235 | B2 | * | 3/2006  | Lu et al. ........................... 16/367 |
| 7,123,476 | B2 | * | 10/2006 | Ke ........................... 361/679.58 |
| 7,129,931 | B2 | * | 10/2006 | Pappas ......................... 345/168 |
| 7,251,129 | B2 | * | 7/2007  | Lee et al. ................. 361/679.55 |
| 7,405,929 | B1 | * | 7/2008  | Chuang et al. ........... 361/679.41 |
| 7,599,178 | B2 | * | 10/2009 | Huang et al. ............. 361/679.43 |
| 7,692,919 | B2 | * | 4/2010  | Liang et al. .............. 361/679.29 |
| 8,074,323 | B2 | * | 12/2011 | Lin ................................. 16/345 |

(Continued)

Primary Examiner — Hoa C Nguyen
Assistant Examiner — Xanthia C Cunningham
(74) Attorney, Agent, or Firm — Muncy, Geissler, Olds & Lowe, P.C.

(57) ABSTRACT

An expanding platform includes a main body, a moving element, a first elastic element and at least one operating element. The main body includes a stop portion. The moving element connects moveably to the main body and includes at least one fixed element. The at least one operating element connected movably to the moving element can move relative to the moving element, and each operating element includes a first operating portion and a second operating portion. The moving element is fixed at an initial position by the stop portion blocking the second operating portion. The first operating portion is pressed when inserting a portable electronic apparatus, and the second operating portion can be moved to escape from the stop portion. The moving element moves to a locking position by the first elastic element and locks the portable electronic apparatus by the at least one fixed element.

20 Claims, 16 Drawing Sheets

(56) References Cited

U.S. PATENT DOCUMENTS

| | | | |
|---|---|---|---|
| 8,373,984 B2* | 2/2013 | Lin et al. | 361/679.41 |
| 8,817,456 B2* | 8/2014 | Lin et al. | 361/679.29 |
| 8,867,203 B2* | 10/2014 | Katsuta et al. | 361/679.43 |
| 2003/0231465 A1* | 12/2003 | Weng | 361/686 |
| 2004/0052036 A1* | 3/2004 | DeLuga | 361/679 |
| 2006/0092605 A1* | 5/2006 | DeLuga et al. | 361/686 |
| 2007/0058338 A1* | 3/2007 | Lee | 361/687 |
| 2008/0055844 A1* | 3/2008 | Kobayashi et al. | 361/686 |
| 2009/0027849 A1* | 1/2009 | Tanaka | 361/686 |
| 2010/0091446 A1* | 4/2010 | Kuo | 361/679.43 |
| 2011/0141685 A1* | 6/2011 | Hung et al. | 361/679.43 |
| 2012/0212900 A1* | 8/2012 | Hung | 361/679.41 |
| 2013/0128449 A1* | 5/2013 | Chen | 361/679.43 |

\* cited by examiner

PORTABLE ELECTRONIC APPARATUS, EXPANDING PLATFORM AND COMBINATION APPARATUS THEREOF

BACKGROUND OF THE INVENTION

1. Field of the Invention

The present invention relates to an expanding platform, and more particularly, to an expanding platform that can be easily combined with and detached from a portable electronic apparatus.

2. Description of the Related Art

In recent years, portable computers such as Tablet PCs have been most users' favorite. Compared to ordinary laptops, tablet computers are more portable and support touch input for allowing more intuitive in operation. For users who are used to keyboard input, since the tablet computer is not configured with a physical keyboard, where more input does not fit. Therefore, the expanding platform specifically designed for tablet computers began to appear on the market, which has been provided with a keyboard module for user input. The user can combine the tablet PC with the expanding platform to make the two electrically connected to form a flip-like use pattern similar to a notebook computer. After the user rotates the tablet PC relative to the expanding platform to a viewable angle, the tablet PC can be operated like a notebook computer, and the keyboard module disposed on the expanding platform can be used for command entry.

Conventionally when a user wishes to use the expanding platform, he or she can insert the tablet PC directly into the expanding platform to form an electrical connection. When the user wishes to detach the tablet PC from the expanding platform, a direct force will be applied to the tablet PC such that the tablet PC can be pulled out from the expanding platform. Since the conventional expanding platform did not provide the stable fixing effect for the tablet PC, and the tablet PC may inadvertently be departed from the expanding platform. In addition, the user may damage the surface or the connection interface of the tablet PC due to improper force during inserting or detaching the tablet PC, which may cause more inconvenience to the user.

Accordingly, it is a worthy topic of research to provide an expanding platform structure that can be easily inserted or detached from a portable electronic device.

SUMMARY OF THE INVENTION

It is a major object of the present invention to provide an expanding platform that can be easily combined with and detached from a portable electronic apparatus.

In order to achieve the above object, the expanding platform in the present invention comprises a main body, a moving element, and at least one operating element. The main body comprises a stop portion. The moving element is movably connected to the main body to move to an initial position or a locking position, or an unlocking position relative to the main body. The moving element comprises at least one fixed element and a first elastic element. The first elastic element comprises two ends that are respectively connected to the main body and the moving element. The at least one operating element is connected movably to the moving element to move relative to the moving element. Each operating element comprises a first operating portion and a second operating portion. The first operating portion is protruded from the main body. The second operating portion is disposed at a height corresponding to the stop portion. The moving element is fixed at the initial position by the stop portion blocking the second operating portion. The first operating portion is pressed when inserting a portable electronic apparatus, and the second operating element is moved to escape from the stop portion. The moving element moves to the locking position by the first elastic element and locks the portable electronic apparatus by the at least one fixed element.

In an embodiment of the present invention, a pivot is formed in a junction of the operating element and the moving element, such that the first operating portion is forced to swing and move relative to the moving element by the pivot to escape from the stop portion.

In an embodiment of the present invention, the operating element further comprises a sleeve-connecting portion which is slidably connected to the moving element; a second elastic element is disposed between the operating element and the moving element to provide a reposition effect after the operating element is forced to slide relative to the moving element.

The present invention further includes a portable electronic apparatus that can be inserted into the expanding platform described above. Through the design of the corresponding structural components, the moving element in an initial position can be driven when the portable electronic apparatus of the present invention is inserted in the expanding platform. When the moving element is moved to the locking position, the portable electronic apparatus will be fixed on the expanding platform; when the moving element is moved to an unlocking position, the portable electronic apparatus can be pulled out from the expanding platform.

The present invention further includes a combination apparatus that includes the above-mentioned portable electronic apparatus and the above-mentioned expanding platform.

Accordingly, the expanding platform for the portable electronic apparatus in the present invention can provide fixing effect for the portable electronic apparatus through directly assembling the portable electronic apparatus. Also, the portable electronic apparatus can be easily detached from the expanding platform without being damaged, so as to increase the convenience of using.

DETAILED DESCRIPTION OF THE PREFERRED EMBODIMENT

The advantages and innovative features of the invention will become more apparent from the following detailed description when taken in conjunction with the accompanying drawings.

Figure 1:
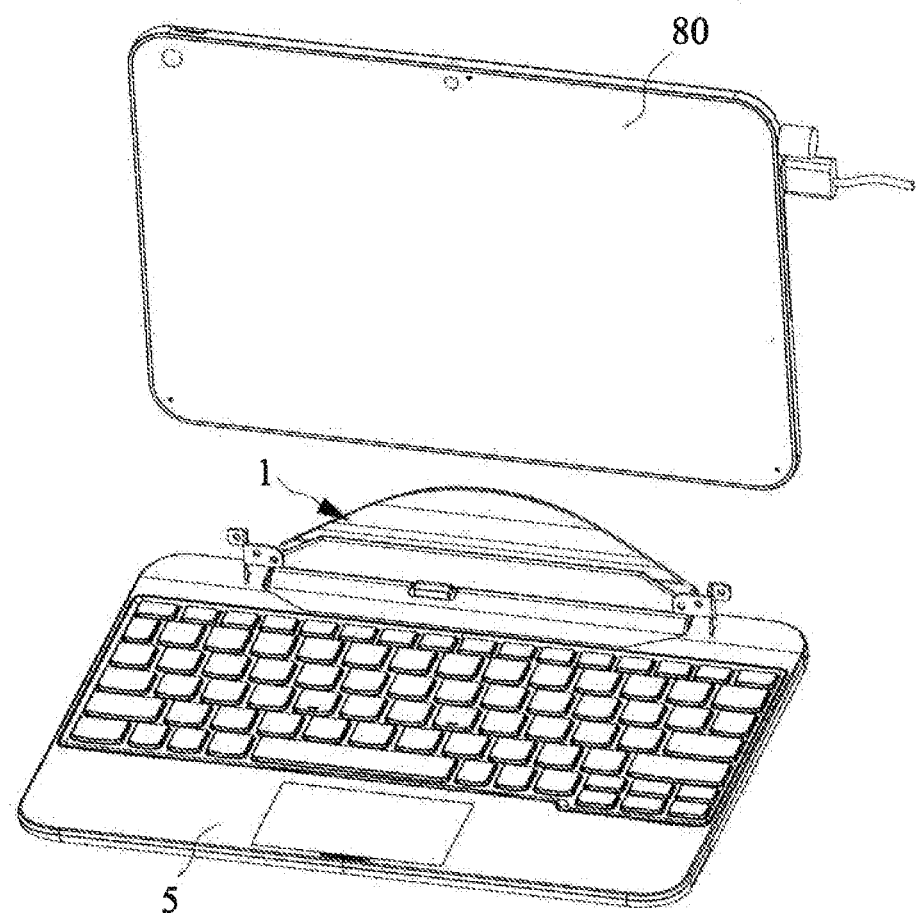
FIG. 1 is a schematic view showing the use of an expanding platform for inserting a portable electronic apparatus in the present invention.

Please first refer to FIG. 1, which is a view showing the use of an expanding platform 1 for inserting a portable electronic apparatus 80 in the present invention.

As shown in FIG. 1, the expanding platform 1 of the present invention can be used for inserting the portable electronic apparatus 80 by means of a main body 10. The main body 10 can be combined with the base 5 disposed a keyboard module for user to operate. In order to clearly illustrate the structure and characteristics of the present invention, the base 5 is omitted in the following figures. In addition, in each of the following embodiments, tablet PCs will be used as example for the portable electronic apparatus 80. However, according to different types of applications, the portable electronic apparatus 80 can also be a smart phone or other electronic device with a similar structure and is not limited to the present embodiment.

Figure 2A:
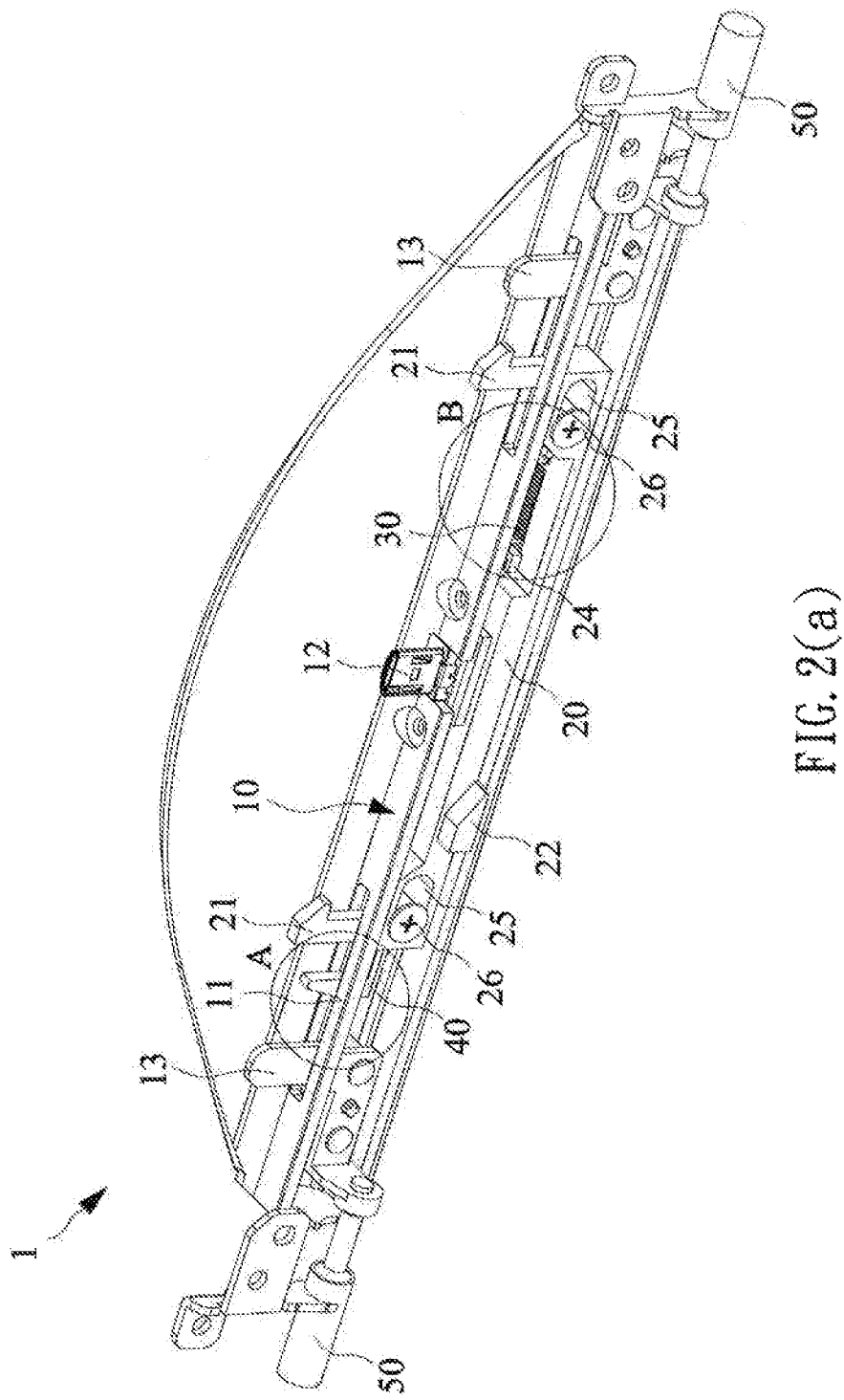
FIG. 2(a) is a structure view of an expanding platform in the present invention.
Figure 2C:
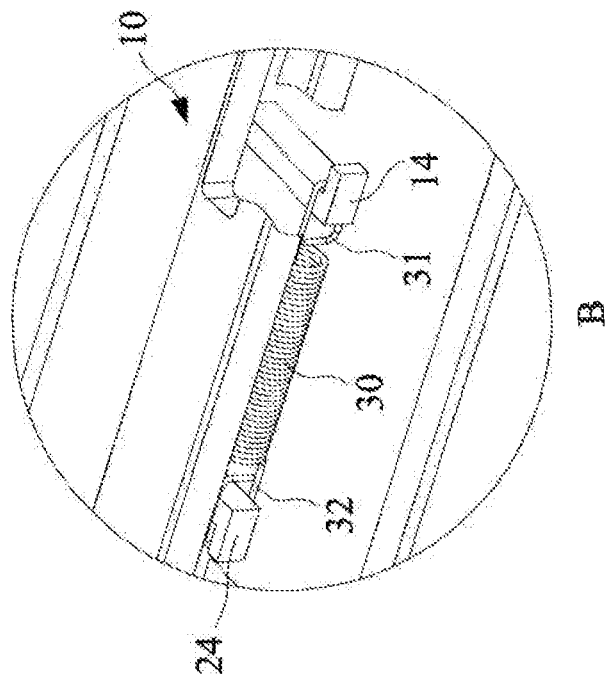
FIG. 2(c) is a partial structure view of a circular area B of main body of the expanding platform as shown in FIG. 2(a) in the present invention.
Figure 2B:
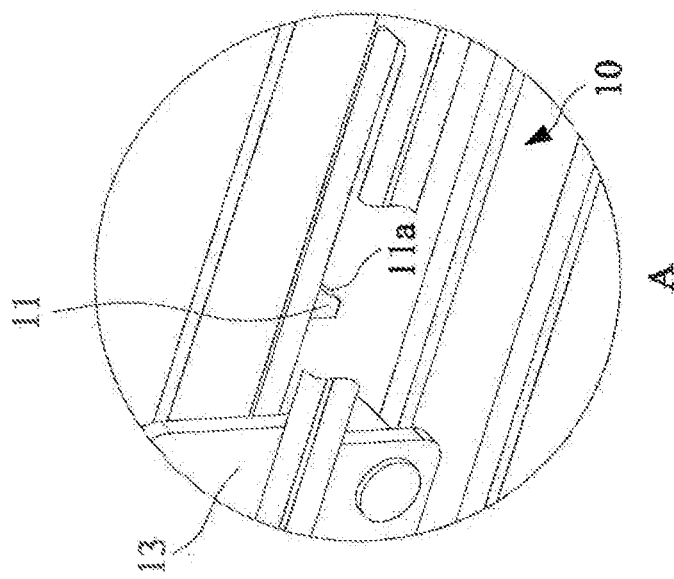
FIG. 2(b) is a partial structure view of a circular area A of a main body of the expanding platform as shown in FIG. 2(a) in the present invention.

Please refer to FIG. 2(a), FIG. 2(b), and FIG. 2(c). FIG. 2(a) is a structure view of the expanding platform 1 in the present invention; FIG. 2(b) is a partial structure view of a circular area A of the main body 10 of the expanding platform 1 as shown in FIG. 2(a) in the present invention; FIG. 2(c) is a partial structure view of a circular area B of the main body 10 of expanding platform 1 as shown in FIG. 2(a) in the present invention. It should be noted that in order to clearly illustrate the structural design of main body 10 the moving element 20 is omitted in FIGS. 2(b) and 2(c), and only the fixed portion 24 of the moving element 20 is kept in FIG. 2(c).

As shown in FIG. 2(a), the expanding platform 1 of the portable electronic apparatus in the present invention comprises a main body 10, a moving element 20, a first elastic element 30, and at least one operating element 40. The main body 10 is pivotally connected to the aforementioned base (not shown) by a pivoting element 50, such that the main body 10 can be rotated relative to the base. The main body 10 comprises a connection interface 12 and at least one positioning element 13. The connection interface 12 is used for electrically connecting the portable electronic apparatus, and the type of the interface can be in the form of USB or other data transmission interface. The at least one positioning element 13 is used for limiting an inserted location of the portable electronic apparatus. In the present embodiment, two positioning elements 13 can be respectively disposed on two opposite sides of the main body 10, but the present invention is not limited to this. As shown in FIG. 2(a) and FIG. 2(b), the main body 10 further comprises a stop portion 11 corresponded to the operating element 40 to block the movement of the moving element 20. In the present embodiment, the stop portion 11 includes a second corresponding inclined plane 11a designed in coordination with a corresponding structure of the at least one operating element 40.

The moving element 20 can be movably connected to the main body 10 to move to an initial position, a locking position, or an unlocking position relative to the main body 10. In the present embodiment, the moving element 20 includes a plurality of sliding holes 25. Each locking element 26 correspondingly passes through each hole 25 such that the moving element 20 is combined with the main body 10. Also, the moving element 20 can be moved relative to the main body 10 by the locking element 26 moving along the hole 25, but the present invention is not limited to this. The moving element 20 includes at least one fixed element 21. Each fixed element 21 is protruded form the main body 10 for fixing the inserted portable electronic apparatus. In addition, the moving element 20 further includes a fixed portion 24 (e.g. a hook) for fixing the first elastic element 30.

As shown in FIG. 2(a) and FIG. 2(c), the first elastic element 30 comprises two ends 31 and 32. The two ends 31 and 32 are respectively connected to the hooking element 14 of the main body 10 and the fixed portion 24 of the moving element 20, such that the first elastic element 30 can provide the elastic restoring force after the moving element 20 is moved relative to the main body 10.

The at least an operating element 40 is connected movably to the moving element 20 to move relative to the moving element 20. In each following embodiment of the present invention, a single operating element 40 is used for illustration, but the number of the operating element 40 can be adjusted depending on requirements.

Figure 3A:
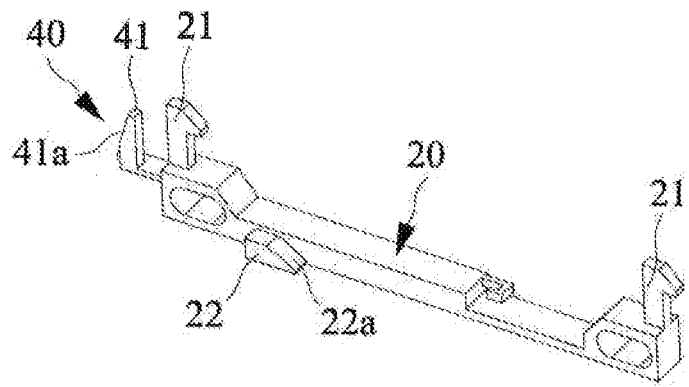
FIG. 3(a) is a structure view of a moving element and an operating element of the expanding platform in a first embodiment of the present invention.
Figure 3B:
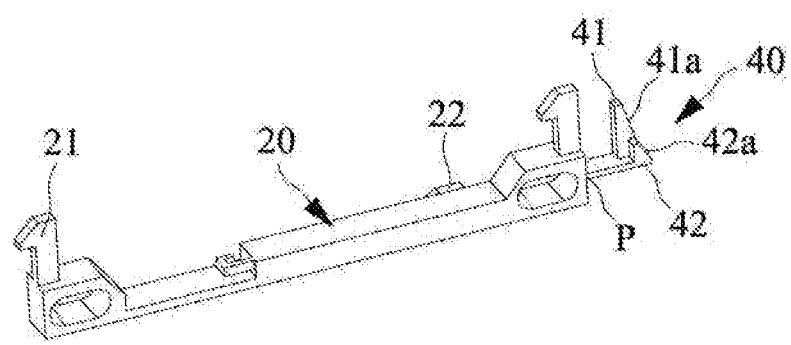
FIG. 3(b) is a structure view showing a of the moving element and operating element of the expanding platform in another viewing angle in the first embodiment of the present invention.

Please refer to both FIG. 3(a) and FIG. 3(b). FIG. 3(a) is a structure view of the moving element 20 and operating element 40 of the expanding platform 1 in the first embodiment of the present invention; FIG. 3(b) is a structure view of the moving element 20 and operating element 40 of the expanding platform 1 in another viewing angle in the first embodiment of the present invention.

As shown in FIG. 3(a) and FIG. 3(b), by the structural design in this embodiment, a pivot P is formed in a junction of the operating element 40 and moving element 20. When the operating element 40 is forced, the operating element 40 can be swung and moved relative to the moving element 20 by means of the pivot P. Each operating element 40 comprises a first operating portion 41 and a second operating portion 42. Each of the first operating portion 41 and the second operating portion 42 is a hook, such that the operating element 40 is formed as a composite hooking structure, and a height of the first operating portion 41 is higher than a height of the second operating portion 42. The first operating portion 41 comprises a first inclined plane 41a, and the second operating portion 42 comprises a second inclined plane 42a. The second corresponding is inclined plane 11a of the stop portion 11 corresponds to the second inclined plane 42a.

Please also refer to FIG. 2(a), when the moving element 20 is combined with the main body 10, the first operating portion 41 is protruded from the main body 10, and the second operating portion 42 is disposed at a height corresponding to the stop portion 11. In addition, in this embodiment, the moving element 20 further includes a pushed portion 22. The pushed portion 22 includes an inclined-plane structure 22a for a user to operate in coordination with other linked components to move the moving element 20 towards a direction substantially parallel to a surface of main body 10, but the present invention is not limited to this. For example, the pushed portion 22 can also be directly extended and exposed on the surface of main body 10 to form a sliding operating element, so that the user can directly push the pushed portion 22 towards a direction substantially parallel to the moving element 20 to move the moving element 20.

Figure 4:
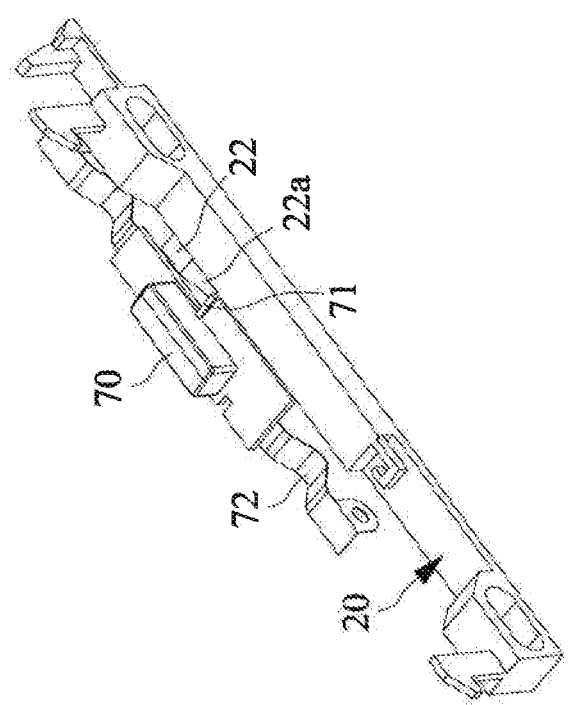
FIG. 4 is a structure view of the moving element of the expanding platform operated in coordination with a button element in the first embodiment of the present invention.

Please refer to FIG. 4, which is a structure view of the moving element 20 of the expanding platform 1 operated in coordination with a button element 70 in the first embodiment of the present invention.

As shown in FIG. 4, in this embodiment, the expanding platform 1 further comprises a button element 70. The button element 70 is movably combined with the main body (not shown) and disposed at a location corresponding to the pushed portion 22 of the moving element 20. The button element 70 comprises a corresponding pushed structure 71, which can be a curved surface or an inclined structure for providing an interaction effect with an inclined-plane structure 22a of the pushed portion 22. When the button element 70 is pressed by an external force, the corresponding pushed structure 71 of the button element 70 pushes the inclined-plane structure 22a of the pushed portion 22 to drive the moving element 20 to move towards a direction being substantially perpendicular to the pressed direction of the button element 70. In addition, the present embodiment further includes a button spring 72 to form a protruding structure for contracting with the main body. The button spring 72 can provide an elastic restoring force after the button element 70 is pressed by an external force, which enables the button element 70 to move back to its original location.

Figure 5A:
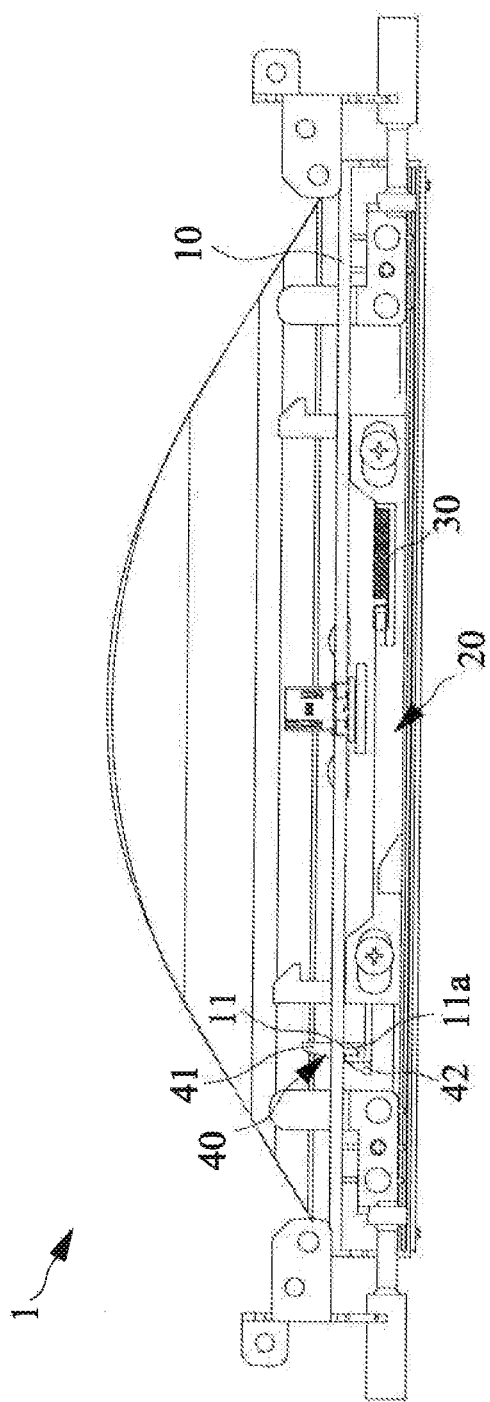
FIG. 5(a) is a schematic view of the moving element of the expanding platform in an initial position in the present invention.
Figure 5B:
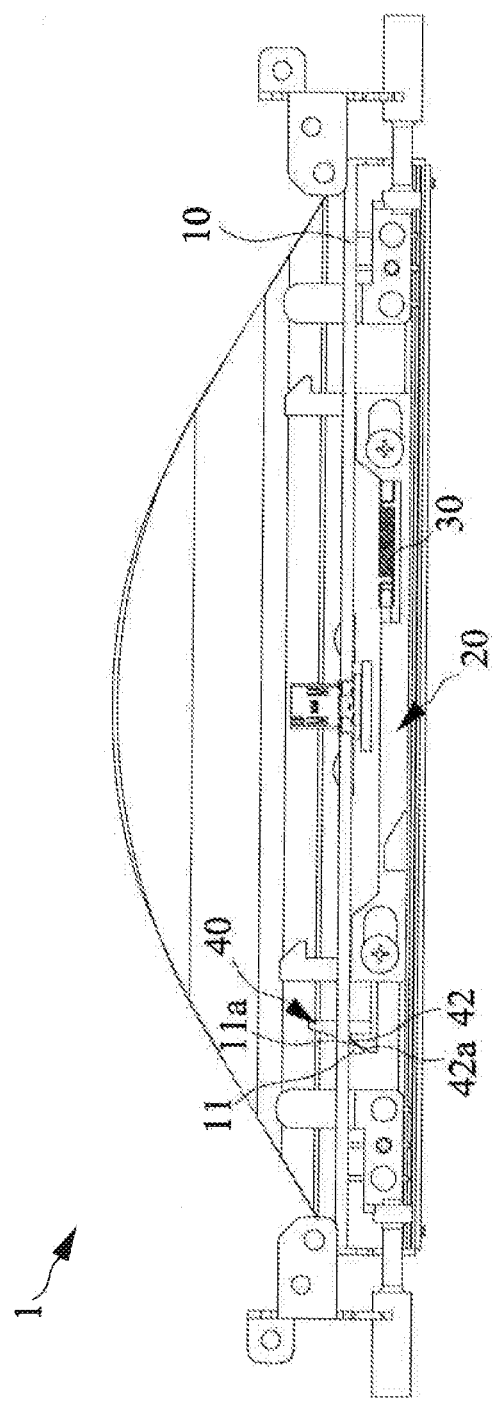
FIG. 5(b) is a schematic view of the moving element of the expanding platform in a locking position in the present invention.
Figure 5C:
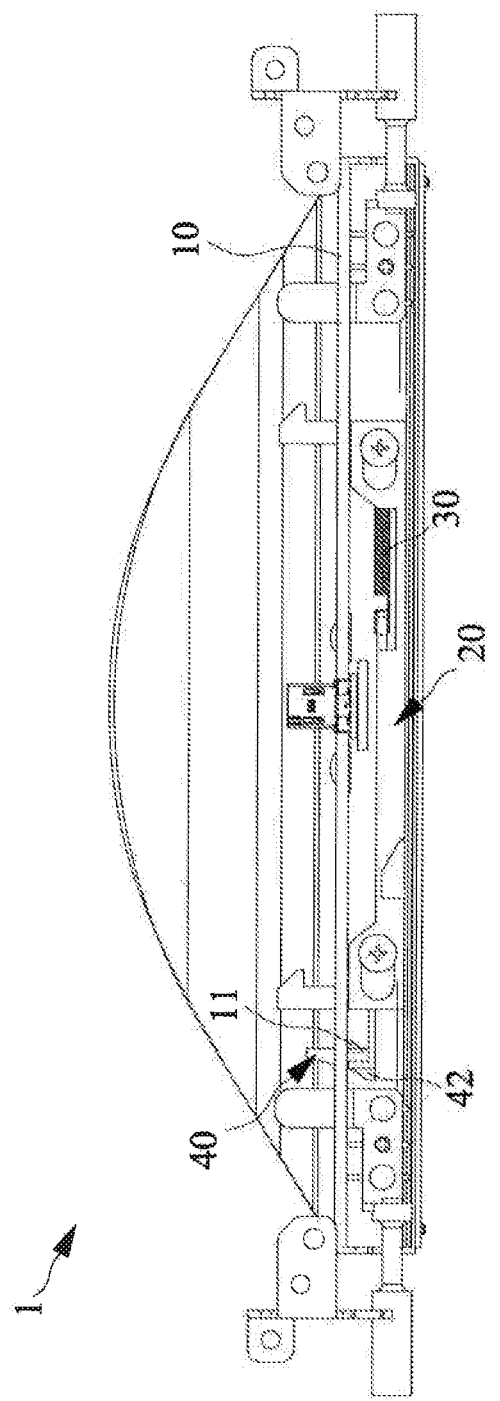
FIG. 5(c) is a schematic view of the moving element of the expanding platform in an unlocking position in the present invention.

Please refer to both FIG. 5(a) to FIG. 5(c). FIG. 5(a) is a schematic view of the moving element 20 of the expanding platform 1 in an initial position in the present invention; FIG. 5(b) is a schematic view of the moving element 20 of the expanding platform 1 in a locking position in the present invention; FIG. 5(c) is a schematic view of the moving element 20 of the expanding platform 1 in an unlocking position in the present invention.

As shown in FIG. 5(a), the stop portion 11 comprises a second corresponding inclined plane 11a operated in coordination with the second inclined plane of the second operating portion 42. When the moving element 20 is in the initial position, the moving element 20 is fixed by the stop portion 11 of the main body 10 blocking the second operating portion 42 of the operating element 40; at this time, the first elastic element 30 is maintained in a tensile state. When the second operating portion 42 of the operating element 40 escapes from the stop portion 11, the moving element 20 can be moved to the locking position by the elastic restoring force of the first elastic element 30, while the at least one fixed element 21 is also driven to a specific location, as shown in FIG. 5(b). When the user pushes the pushed portion 22 (e.g. by the button element or directly forcing the pushed portion 22), the moving element 20 can be moved from the locking position to the unlocking position. During the movement of the moving element 20, the second operating portion 42 of the operating element 40 crosses the stop portion 11 with the aforementioned inclined-plane design, and continuously moves some distance to reach the unlocking position, as shown in FIG. 5(c).

Figure 6A:
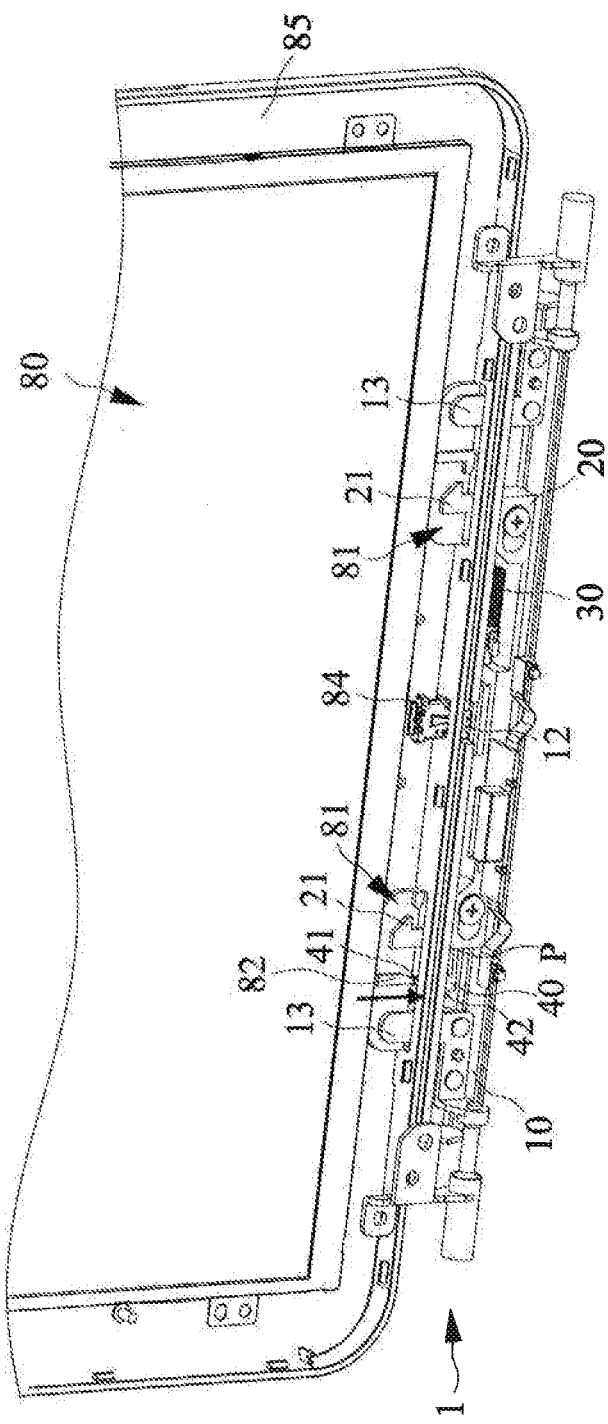
FIG. 6(a) is an overall schematic view of the expanding platform of the present invention during inserting the portable electronic apparatus.
Figure 6B:
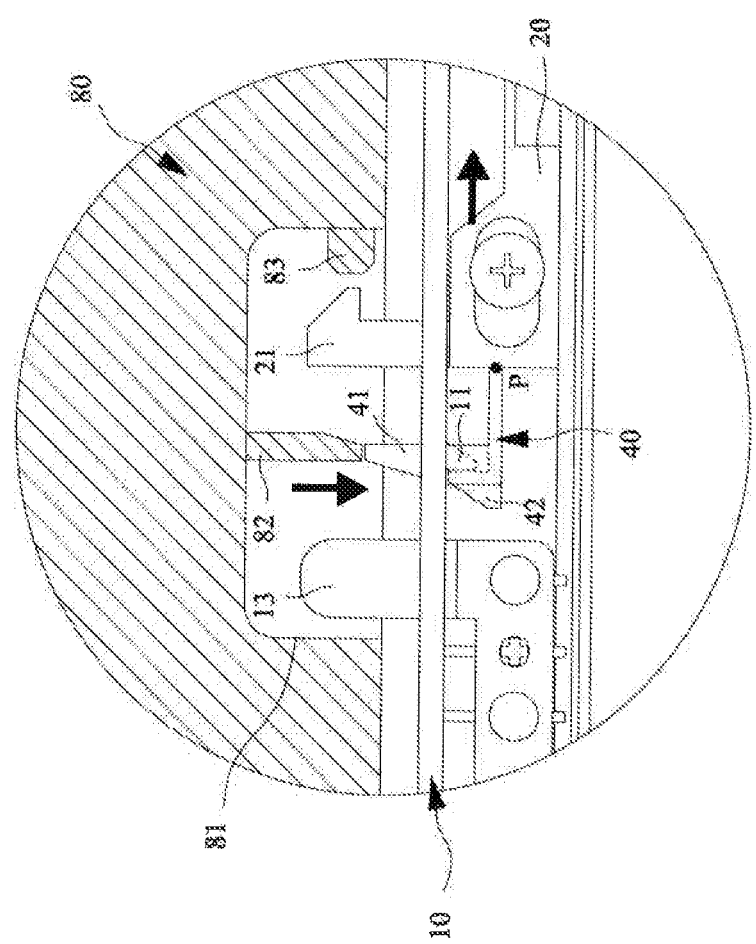
FIG. 6(b) is a partial schematic view of the expanding platform of the present invention during inserting the portable electronic apparatus.

Please refer to both FIG. 6(a) and FIG. 6(b). FIG. 6(a) is an overall schematic view of the expanding platform 1 of the present invention during inserting the portable electronic apparatus 80; FIG. 6(b) is a partial schematic view of the expanding platform 1 of the present invention during inserting the portable electronic apparatus 80. The portable electronic apparatus 80 described herein adopts a structural design corresponding to the expanding platform 1 of the present invention, but the present invention is not limited to this.

As shown in FIG. 6(a) and FIG. 6(b), when a user wants to insert the portable electronic apparatus 80 in the expanding platform 1 of the present invention, the inserted location of the portable electronic apparatus 80 is limited by the design of each positioning element 13 on the main body 10, while the corresponding connection interface 84 of the portable electronic apparatus 80 can be aligned with the connection interface 12 of the main body 10. When the portable electronic apparatus 80 is gradually inserted into the expanding platform 1 of the present invention, each positioning element 13 of the main body 10 and each protruding fixed element 21 can also gradually inserted correspondingly into each receiving portion 81 of the portable electronic apparatus 80. At this time, the moving element 20 is retained at the initial position as shown in FIG. 6(a).

Then, the pressing element 82 of the portable electronic apparatus 80 can contact with the first operating portion 41 of the operating element 40 protruded from the main body 10, such that the first operating portion 41 is pressed to swing and move relative to the moving element 20 with the aforementioned pivot P (as the direction of the arrow shown in the figure). The second operating portion 42 can be driven to escape from the stop portion 11, so that the moving element 20 can be moved towards the locking position by the first elastic element 30.

Figure 7A:
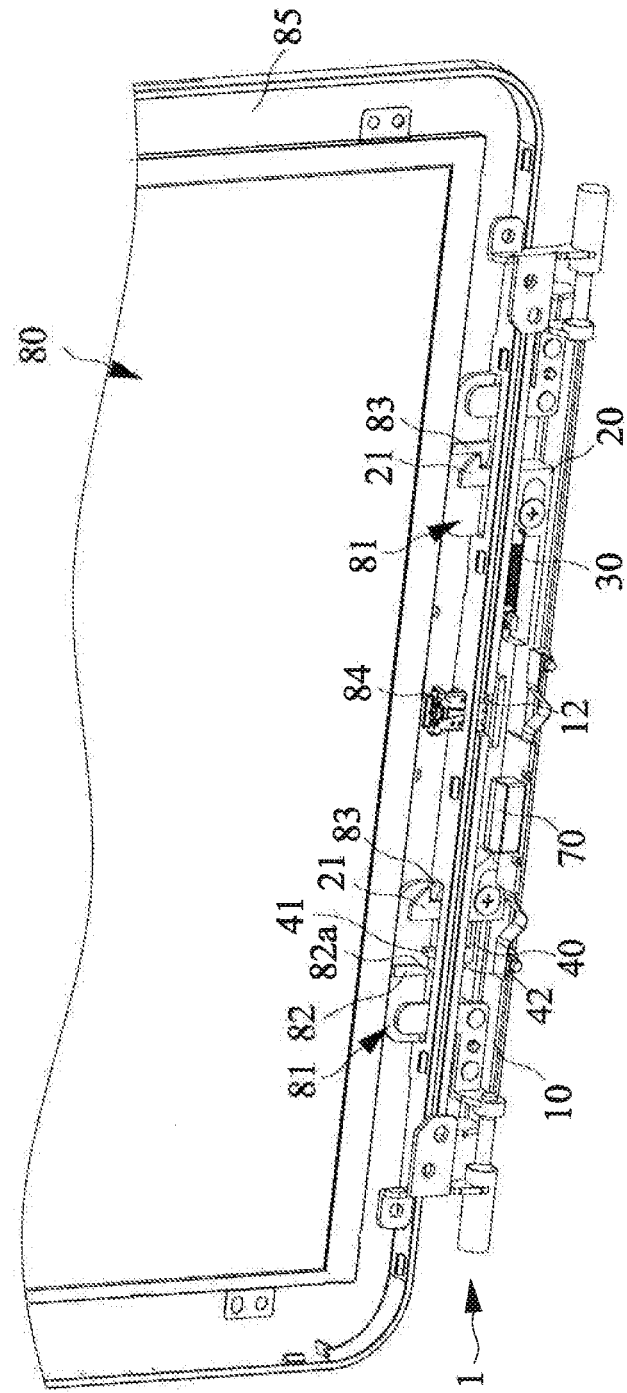
FIG. 7(a) is an overall schematic view of the expanding platform of the present invention after the portable electronic apparatus has been inserted therein.
Figure 7B:
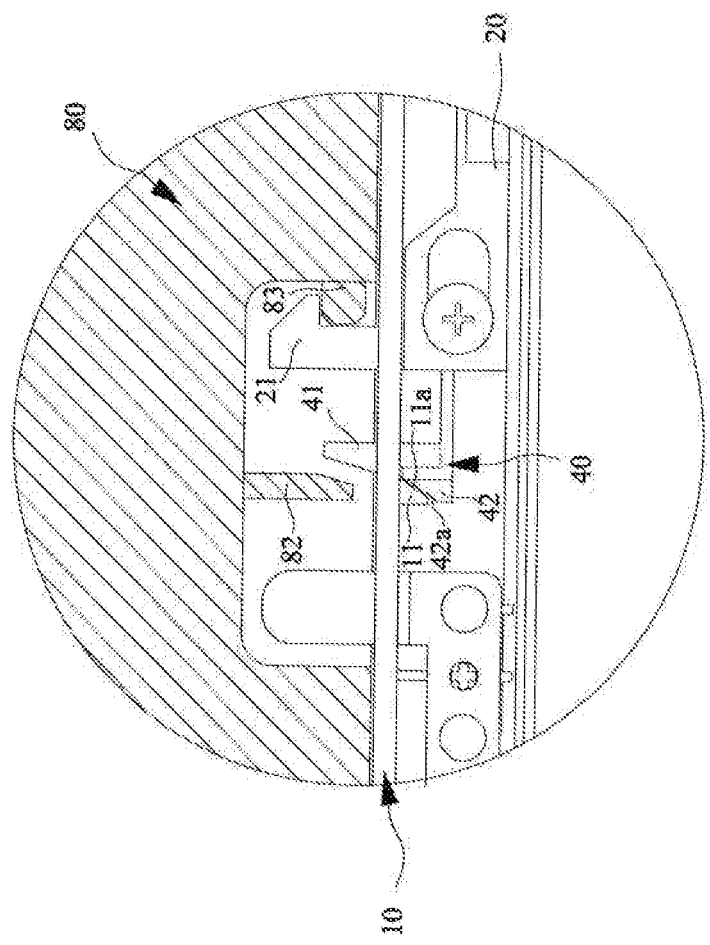
FIG. 7(b) is a partial schematic view of the expanding platform of the present invention after the portable electronic apparatus has been inserted therein.

Please refer to both FIG. 7(a) and FIG. 7(b). FIG. 7(a) is an overall schematic view of the expanding platform 1 of the present invention after the portable electronic apparatus 80 has been inserted therein; FIG. 7(b) is a partial schematic view of the expanding platform 1 of the present invention after the portable electronic apparatus 80 has been inserted therein.

As shown in FIG. 7(a) and FIG. 7(b), when the portable electronic apparatus 80 has been inserted, the corresponding connection interface 84 of portable electronic apparatus 80 has been electrically connected to the connection interface 12 of main body 10, and the moving element 20 has been moved to the locking position. By the fixed effect generated by each fixed element 21 on the moving element 20 with the corresponding fixed structure 83 in the receiving portion 81 of the portable electronic apparatus 80. Therefore, the portable electronic apparatus 80 is firmly inserted into the expanding platform 1 of the present invention.

Figure 7C:
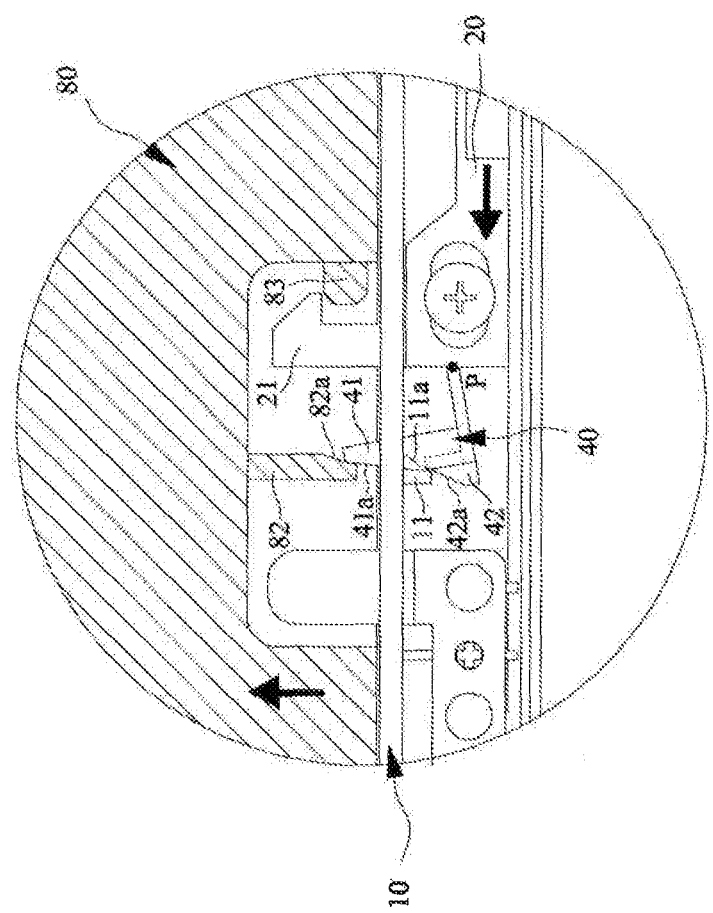
FIG. 7(c) is a partial schematic view of the expanding platform of the present invention when the portable electronic apparatus is in an unlocking process.

Please also refer to FIG. 7(a) to FIG. 7(c). FIG. 7(c) is a partial schematic view of the expanding platform 1 of the present invention when the portable electronic apparatus 80 is in an unlocking process.

As shown in FIG. 7(a) and FIG. 7(b), when the user wants to make the portable electronic apparatus 80 detach from the expanding platform 1 of the present invention, in this embodiment, the user presses the button element 70 first to push the pushed portion 22 to laterally move the entire moving element 20, such that each fixed element 21 escapes from each aforementioned corresponding fixed structure 83. With the moving element 20 continuously moving towards the unlocking position, the first elastic element 30 can be stretched out. At this time, the second operating portion 42 of operating element 40 will contract with the stop portion 11. By the interaction of the second inclined plane 42a and second corresponding inclined plane 11a, the operating element 40 moves relative to the moving element 20 and drives the second operating portion 42 to cross the stop portion 11.

As shown in FIG. 7(c), the first operating portion 41 of the operating element 40 will contract with the pressing element 82 of the portable electronic apparatus 80. By the interaction of the first inclined plane 41a of the first operating portion 41 and the first corresponding inclined plane 82a of the pressing element 82, the pressing element 82 is protruded upward to make the corresponding connection interface 84 and the connection interface 12 gradually lose and easy for a user to pull the portable electronic apparatus 80 away; on the other hand, the first operating portion 41 crosses the pressing element 82 with the movement of the operating element 40. Finally, the moving element 20 reaches the unlocking position as shown in FIG. 8(b) described thereinafter.

Figure 8A:
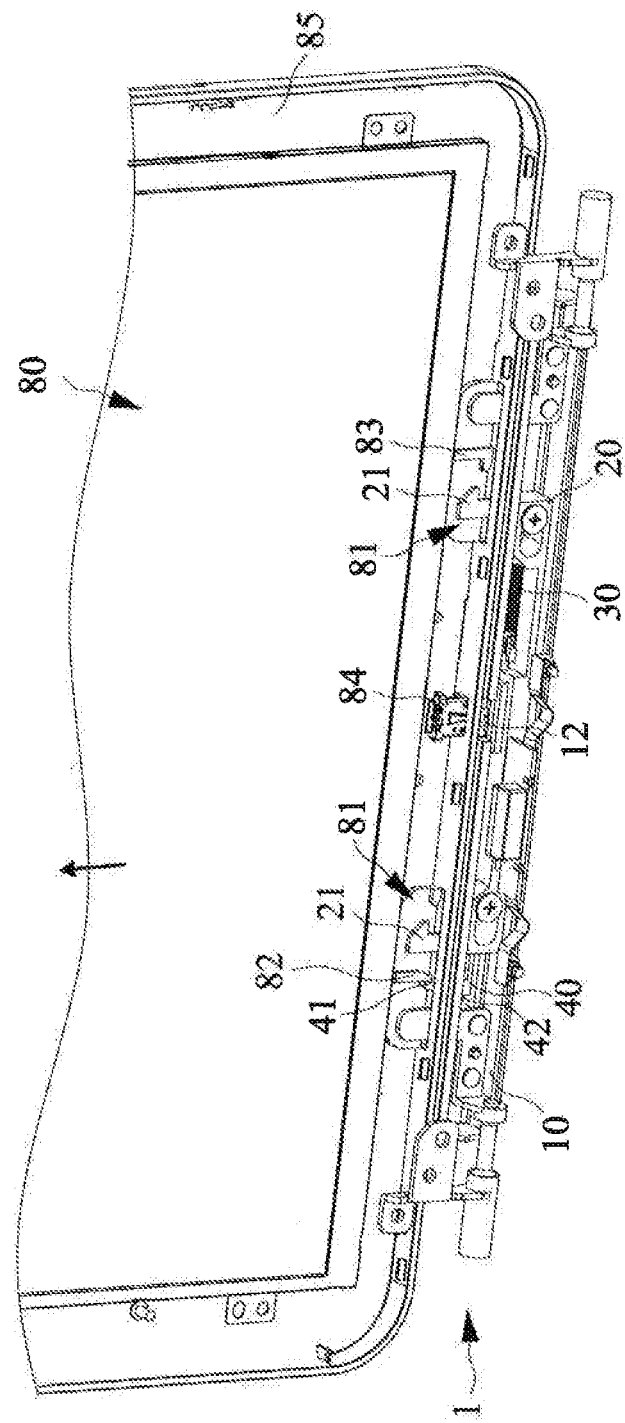
FIG. 8(a) is an overall schematic view of the expanding platform of the present invention after the portable electronic apparatus has been unlocked.

FIG. 8(a) is an overall schematic view of the expanding platform 1 of the present invention after the portable electronic apparatus 80 has been unlocked; FIG. 8(b) is a partial schematic view of the expanding platform 1 of the present invention after the portable electronic apparatus 80 has been unlocked.

Figure 8B:
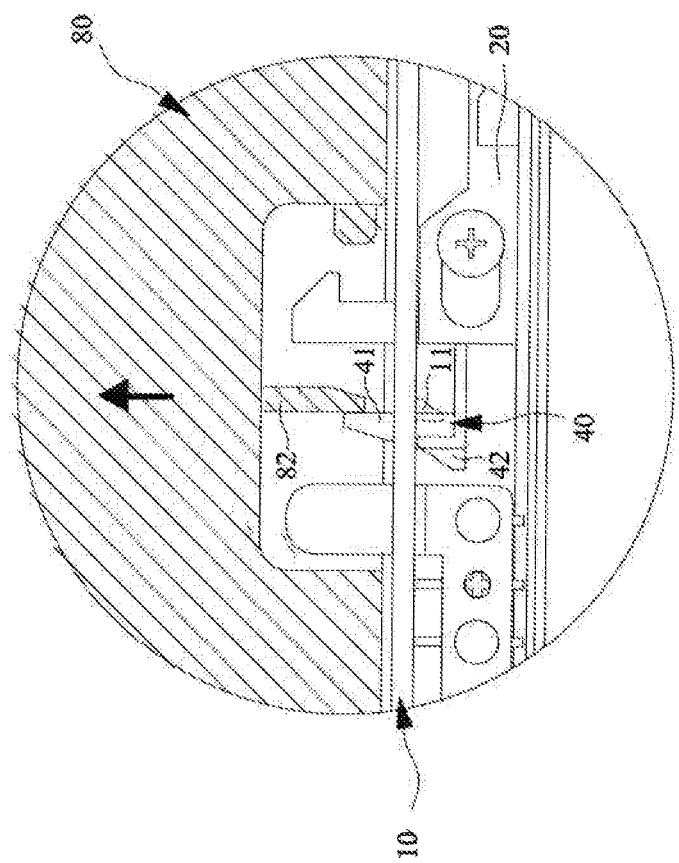
FIG. 8(b) is a partial schematic view of the expanding platform of the present invention after the portable electronic apparatus has been unlocked.

As shown in FIG. 8(a) and FIG. 8(b), when the portable electronic apparatus 80 is not completely pulled away, the moving element 20 is temporarily fixed at the unlocking position by the pressing element 82 blocking the first operating portion 41. At this time, the portable electronic apparatus 80 is unlocked from the expanding platform 1 of the present invention by the aforementioned operation, the user is allowed to pull the portable electronic apparatus 80 away with a single hand. When the portable electronic apparatus 80 is completely pulled away, the moving element 20 without blocking can be moved back again by the first elastic element 30 until the second operating portion 42 is stopped by the stop portion 11. Therefore, the moving element 20 can be moved back to the initial position as shown in FIG. 5(a).

Figure 9:
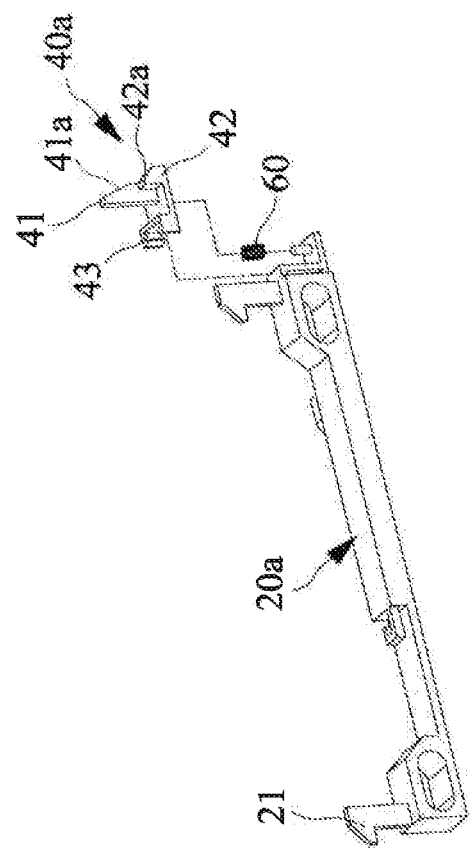
FIG. 9 is a structure view of the moving element and operating element of the expanding platform in a second embodiment of the present invention.

Please refer to FIG. 9, which is a structure view of the moving element 20a and operating element 40a of the expanding platform 1 in a second embodiment of the present invention.

The present embodiment is a variation of the aforementioned first embodiment. As shown in FIG. 9, in this embodiment, by the structural design, the operating element 40a further includes a sleeve-connecting portion 43. The operating element 40a can be slidably connected to the corresponding sliding portion of the moving element 20a by the sleeve-connecting portion 43. In addition, a second elastic element 60 is disposed between the operating element 40a and moving element 20a (i.e. disposed in a sliding direction substantially parallel to the operating element 40a relative to the moving element 20a) for connecting both to provide the restoring effect after the operating element 40a is forced to move relative to the moving element 20a. Therefore, when the first operating portion 41 or the second operating portion 42 of the operating element 40a is forced to move, the operating element 40a can be slidably moved relative to the moving element 20a to escape from the corresponding structure and can move back to its original location by the second elastic element 60.

In addition, the present invention further comprises a portable electronic apparatus 80 that is applied to the aforementioned expanding platform 1 so as to be correspondingly inserted into the expanding platform 1. As shown in FIG. 1 and FIG. 6(a), the portable electronic apparatus 80 comprises a casing 85, a corresponding connection interface 84, at least one receiving portion 81, and at least one pressing element 82. The corresponding connection interface 84, at least one receiving portion 81 and at least one pressing element 82 are all disposed within the casing 85, wherein the disposed number and position of the at least one receiving portion 81 and at least one pressing element 82 can be determined according to the number and position of the corresponding positioning element 13, fixed element 21, and operating element 40 of the expanding platform 1, but are not limited to the present embodiment.

The corresponding connection interface 84 of the portable electronic apparatus 80 is used for electrically connecting the connection interface 12 of the expanding platform 1. Each receiving portion 81 is formed as a receiving space for inserting each positioning element 13 and each fixed element 21 of the expanding platform 1. Each receiving portion 81 comprises a corresponding fixed structure 83, and each corresponding fixed structure 83 is used for correspondingly fixing each fixed element 21. At least one pressing element 82 is disposed within at least one receiving portion 81. The pressing element 82 is used for pressing against (when the moving element 20 is in the initial position) or blocking (when the moving element 20 is in the unlocking position) the first operating portion 41 of the operating element 40. In this embodiment, the pressing element 82 includes a first corresponding inclined plane 82a configured to correspond to the first inclined plane 41a of the first operating portion 41. When the moving element 20 is moved from the locking position to the unlocking position, by the interaction of the first corresponding inclined plane 82a of the pressing element 82 and the first inclined plane 41a of the first operating portion 41, the portable electronic apparatus 80 can be detached from the expanding platform 1.

Through the design of the present invention, the expanding platform for the portable electronic apparatus can provide the function of easily assembling and disassembling the portable electronic apparatus. With a single-hand operation, the portable electronic apparatus can be inserted and fixed at the expanding platform in the present invention. To detach from the portable electronic apparatus, the button element can be controlled by single hand control, such that the portable electronic apparatus can be apart from the expanding platform in the present invention. Therefore, the portable electronic apparatus can be pulled away by a user with a single hand. Since attaching and detaching of the portable electronic apparatus can be completed by a user with a single hand, the present invention can effectively improve the inconvenience of assembling and disassembling the portable electronic apparatus, and provides a stable fixed effect for inserting the portable electronic apparatus into the expanding platform.

As described above, the objectives, means, and effectiveness in the present invention are different to the characteristics in the prior art. It should be noted that the embodiments described above are for illustrating the principles and effects of the present invention, not for limiting the scope of the present invention. Any person skilled in the art shall be able to make modifications and changes to the embodiments without departing from the technical principle and sprit of the present invention. The claims of the present invention within the scope of protection are described below.

What is claimed is:

1. An expanding platform for inserting a portable electronic apparatus, the expanding platform comprising:
    a main body, including a stop portion;
    a moving element, being connected movably to the main body to move to an initial position or a locking position relative to the main body, the moving element including at least one fixed element protruded from the main body;
    a first elastic element, including two ends connected respectively to the main body and the moving element; and
    at least one operating element, being connected movably to the moving element to move relative to the moving element, each said operating element comprising a first operating portion and a second operating portion, the first operating portion protruding from the main body, and the second operating portion being disposed at a height corresponding to the stop portion;
    wherein the moving element is fixed at the initial position by the stop portion blocking the second operating portion; the first operating portion is pressed when inserting the portable electronic apparatus, and the second operating element is moved to escape from the stop portion; the moving element moves to the locking position by the first elastic element and locks the portable electronic apparatus by the at least one fixed element.

2. The expanding platform as claimed in claim 1, wherein the moving element further comprises a pushed portion, the moving element can be moved from the locking position to an unlocking position by moving the pushed portion.

3. The expanding platform as claimed in claim 2, wherein the moving element is fixed at the unlocking position by the first operating portion blocking the portable electronic apparatus.

4. The expanding platform as claimed in claim 2, wherein the main body further comprises a button element disposed corresponding to the pushed portion so as to allow the button element to push the pushed portion when the button element is pressed.

5. The expanding platform as claimed in claim 4, wherein the pushed portion comprises an inclined-plane structure, and the button element comprises a corresponding pushed structure; the button element pushes the inclined-plane structure by the corresponding pushed structure to move the pushed portion when the button element is pressed.

6. The expanding platform as claimed in claim 4, wherein the button element further comprises a button spring for contracting with the main body.

7. The expanding platform as claimed in claim 1, wherein the first operating portion comprises a first inclined plane and the second operating portion comprises a second inclined plane, and the stop portion comprises a second corresponding inclined plane corresponding to the second inclined plane.

8. The expanding platform as claimed in claim 1, wherein a pivot is formed in a junction of the operating element and the moving element, such that the first operating portion is forced to swing and move relative to the moving element by the pivot to escape from the stop portion.

9. The expanding platform as claimed in claim 1, wherein the operating element further comprises a sleeve-connecting portion slidably connected to the moving element; a second elastic element is disposed between the operating element and the moving element for providing a restoring effect after the operating element is forced to move relative to the moving element.

10. The expanding platform as claimed in claim 1, wherein the main body further comprises at least one positioning element for limiting an inserted position of the portable electronic apparatus.

11. A portable electronic apparatus for correspondingly inserting into the expanding platform as claimed in claim 1, the portable electronic apparatus comprising:
    a casing;
    a corresponding connection interface disposed within the casing for electrically connecting the expanding platform;
    at least one receiving portion disposed within the casing, each said receiving portion comprises a corresponding fixed structure, and each the corresponding fixed structure configured to correspondingly block each said fixed element; and
    at least one pressing element disposed within the at least one receiving portion for pressing against or blocking the first operating portion of the operating element.

12. The portable electronic apparatus as claimed in claim 11, wherein the pressing element comprises a first corresponding inclined plane corresponded to the first operating portion of the operating element.

13. A combination apparatus, comprising:
    an expanding platform, comprising:
        a main body, including a stop portion;
        a moving element, being connected movably to the main body to move to an initial position or a locking position relative to the main body the moving element including at least one fixed element protruded from the main body;
        a first elastic element, including two ends connected respectively to the main body and the moving element; and
        at least one operating element, being connected movably to the moving element to move relative to the moving element, each said operating element comprising a first operating portion and a second operating portion, the first operating portion protruding from the main body, and the second operating portion being disposed at a height corresponding to the stop portion; and
    a portable electronic apparatus for correspondingly inserting into the expanding platform, the portable electronic apparatus comprising:
        a casing;
        a corresponding connection interface disposed within the casing for electrically connecting the expanding platform;
        at least one receiving portion disposed within the casing, each said receiving portion comprises a corresponding fixed structure, and each the corresponding fixed structure configured to correspondingly block each said fixed element; and
        at least one pressing element disposed within, the at least one receiving portion for pressing against or blocking the first operating portion of the operating element; and
    wherein the moving element is fixed at the initial position by the stop portion blocking the second operating portion; the first operating portion is pressed when inserting the portable electronic apparatus, and the second operating element is moved to escape from the stop portion; the moving element moves to the locking position by the first elastic element and locks the portable electronic apparatus by the at least one fixed element.

14. The combination apparatus as claimed in claim 13, wherein the moving element further comprises a pushed portion, the moving element can be moved from the locking position to an unlocking position by moving the pushed portion.

15. The combination apparatus as claimed in claim 14, wherein the moving element is fixed at the unlocking position by the first operating portion blocking the portable electronic apparatus.

16. The combination apparatus as claimed in claim 14, wherein the main body further comprises a button element disposed corresponding to the pushed portion so as to allow the button element to push the pushed portion when the button element is pressed; wherein the button element further comprises a button spring for contracting with the main body.

17. The combination apparatus as claimed in claim 16, wherein the pushed portion comprises an inclined-plane structure, and the button element comprises a corresponding pushed structure; the button element pushes the inclined-plane structure by the corresponding pushed structure to move the pushed portion when the button element is pressed.

18. The combination apparatus as claimed in claim 13, wherein the first operating portion comprises a first inclined plane and the second operating portion comprises a second inclined plane, and the stop portion comprises a second corresponding inclined plane corresponding to the second inclined plane; wherein the pressing element comprises a first corresponding inclined plane corresponded to the first operating portion of the operating element.

19. The combination apparatus as claimed in claim 13, wherein a pivot is formed in a junction of the operating element and the moving element, such that the first operating portion is forced to swing and move relative to the moving element by the pivot to escape from the stop portion.

20. The combination apparatus as claimed in claim 13, wherein the operating element further comprises a sleeve-connecting portion slidably connected to the moving element; a second elastic element is disposed between the operating element and the moving element for providing a restoring effect after the operating element is forced to move relative to the moving element.

* * * * *